United States Patent [19]

Christmann

[11] 3,718,031
[45] Feb. 27, 1973

[54] MASS MEASURING SYSTEM APPLIED TO BELT CONVEYORS

[75] Inventor: John L. Christmann, Passaic, N.J.

[73] Assignee: Merrick Scale Mfg. Company, Passaic, N.J.

[22] Filed: Dec. 3, 1970

[21] Appl. No.: 94,778

[52] U.S. Cl. .................................................. 73/67.2
[51] Int. Cl. ............................................. G01g 11/00
[58] Field of Search ............. 177/1, 210; 73/67, 67.2

[56] References Cited

UNITED STATES PATENTS

| | | | |
|---|---|---|---|
| 2,305,783 | 12/1942 | Heymann et al. | 73/67 |
| 2,729,972 | 1/1956 | Schwipetsky | 73/67.2 |
| 3,240,054 | 3/1966 | Roth | 73/67.2 X |
| 3,354,698 | 11/1967 | Christmann | 73/67.2 |

Primary Examiner—James J. Gill
Attorney—John A. Seifert

[57] ABSTRACT

A 90° phase angle lag is created between the resonant vibration frequency of a load on a belt conveyor and the frequency of a motor driven eccentric inducing vibration to stringers supporting the belt conveyor between vertical members and deviation of said phase angle is detected by a phase sensitive network which adjusts the motor. The speed of the motor is converted into a linear alternating current voltage transmitted across a potentiometer adjusted by the speed of the belt conveyor to produce the product of the speed of the belt conveyor and the load on said conveyor.

10 Claims, 8 Drawing Figures

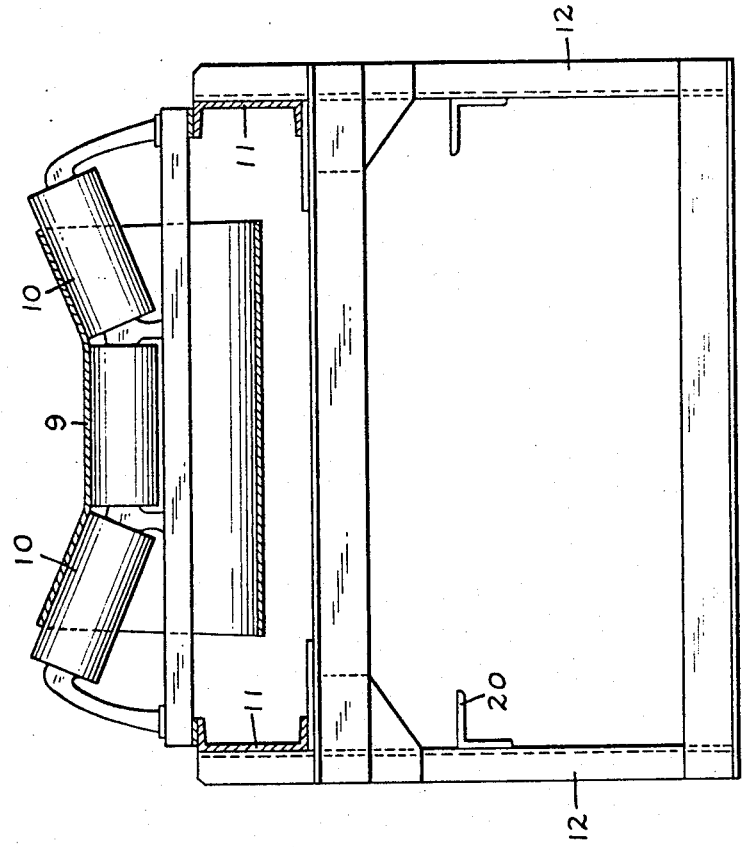
FIG. 5.
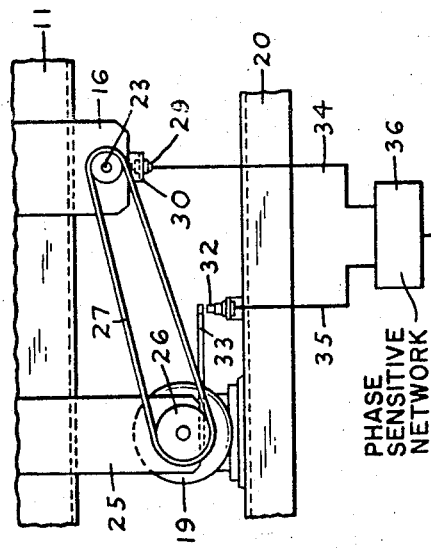
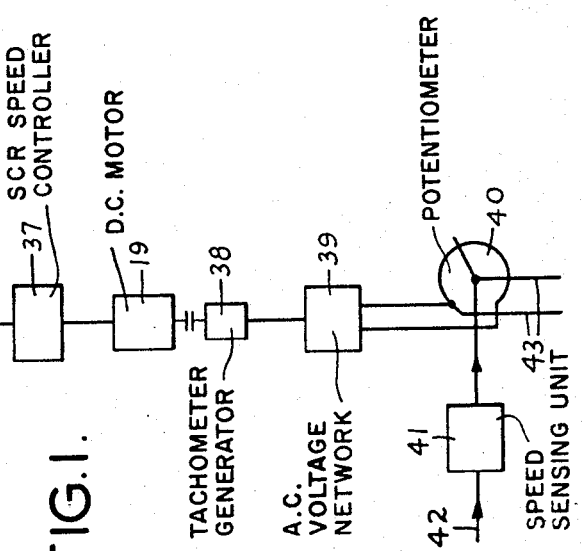
FIG. 1.
INVENTOR
JOHN L. CHRISTMANN
BY
John A. Seifert
ATTORNEY

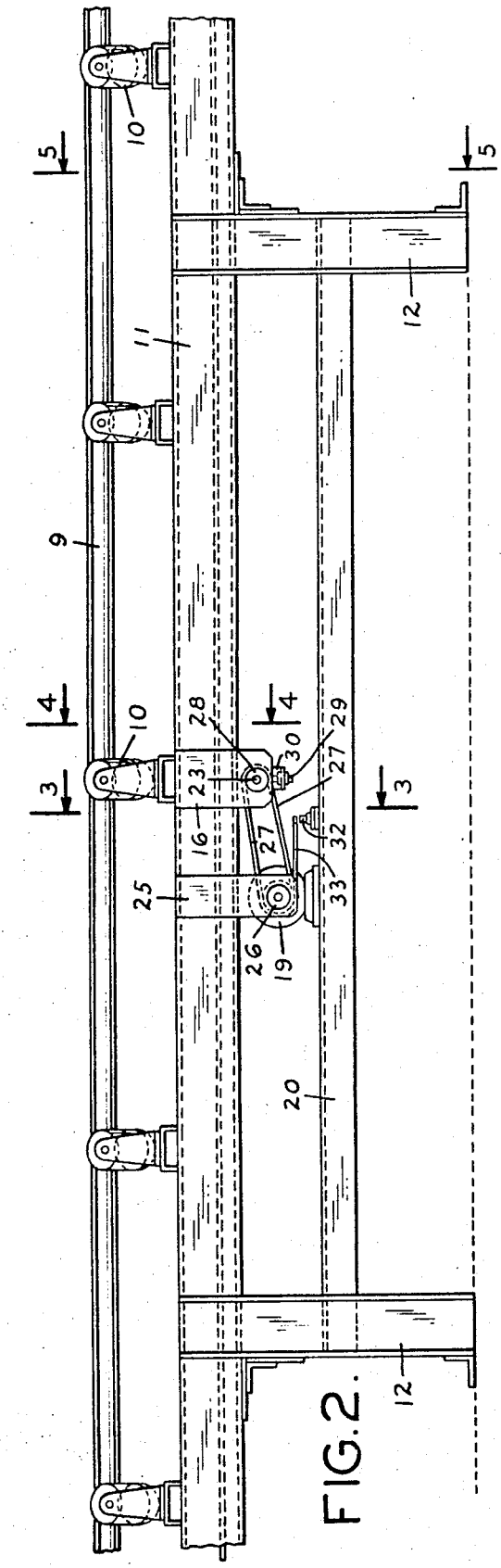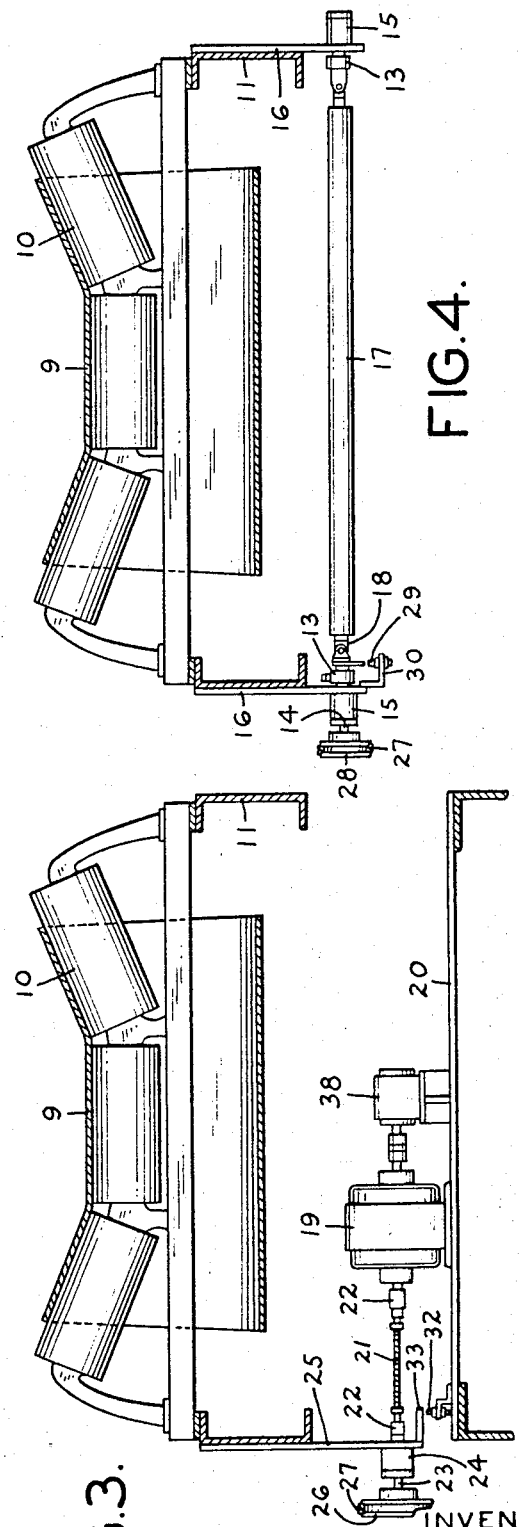

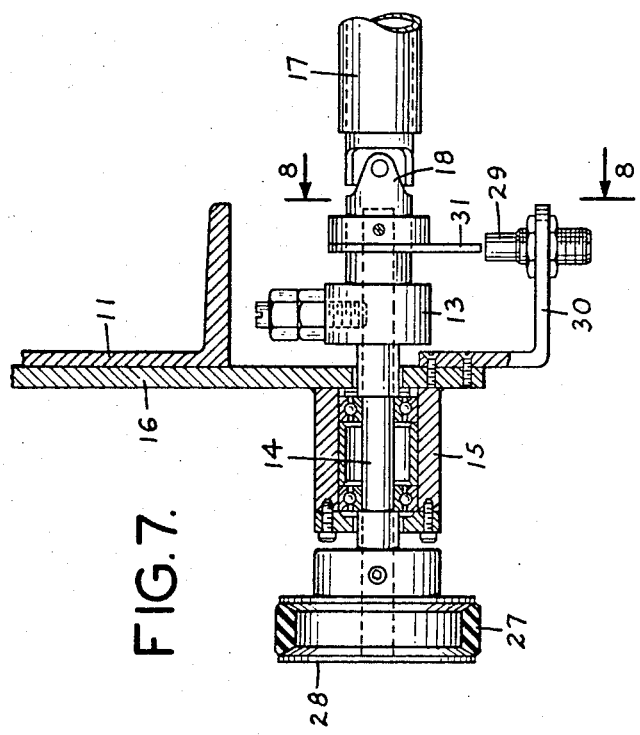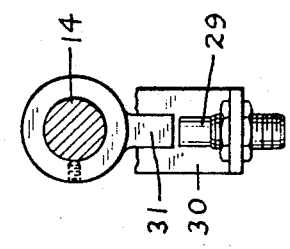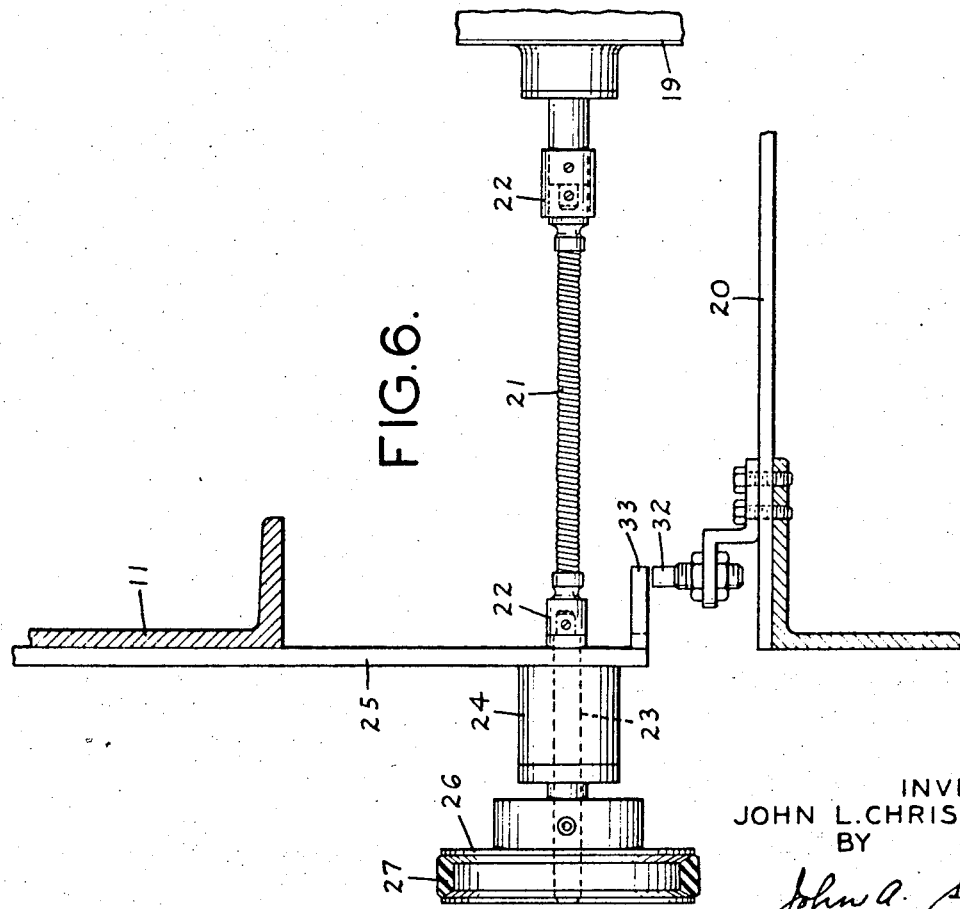

MASS MEASURING SYSTEM APPLIED TO BELT CONVEYORS

My U.S. Pat. No. 3,354,698 issued Nov. 28, 1967 and my U.S. Pat. application Ser. No. 723,834 filed Apr. 24, 1968 now U.S. Pat. No. 3,566,678 issued Mar. 2, 1971 disclose mechanical and electromagnetic means for the excitation of a mass measuring system. In both the patent and patent application, the proper excitation depends chiefly on the amplitude of oscillation and low damping to achieve resonance. Since the amplitude varies also with differing mass, the correct resonant frequency is difficult to achieve.

My U.S. Pat. application Ser. No. 875,621 filed Nov. 12, 1969 now U.S. Pat. No. 3,608,359 issued Sept. 28, 1971, shows the use of the phase angle which at ninety degrees gives an unequivocal and accurate indication of resonance under all load conditions. This was accomplished by applying a torsional member, an eccentric and a SCR controlled direct current motor to a specially devised drum weigher and feeder.

The present invention relates to measuring and testing vibration for resonance, frequency and/or amplitude study, and applies the principles of my U.S. Pat. application Ser. No. 875,621 now U.S. Pat. No. 3,608,359 issued Sept. 28, 1971, to a conventional belt conveyor without requiring any undue modification of the conveyor besides the addition of vertical supports and a few simple subassemblies easily adapted to the conveyor stringers.

The objects and advantages of the present invention are that no extra head or side room is required and the conveyor idlers do not need any shimming provided they support the conveyor properly.

Also the location of the scale unit on the conveyor is unimportant since with the mass measuring system forces do not affect the frequency only the amplitude.

No prior art is known which creates a ninety degree phase angle lag between the resonant vibration frequency of a load on a belt conveyor and the frequency of a motor driven eccentric inducing vibration to stringers supporting the belt conveyor between vertical members.

The present invention includes a belt conveyor supported by idlers suspended between stringers supported by spaced vertical members to form springs or vibrating members of said stringers. An eccentric is rotatably supported by the stringers and driven by a direct current motor supported by the vertical members independently of the stringers. The ninety degree phase angle between the vibrating frequency of the load on the conveyor and the frequency or speed of the motor is checked by two suitable means, such as induction coils, one being mounted on the bearing of the eccentric and pulsed by an one tooth pulser wheel rotatable with the eccentric according to the speed of the motor. The other induction coil is supported by the vertical members and actuated or vibrated by an arm extending from a stringer. The checking means or induction coils are part of a phase sensitive network electrically connected to a SCR speed controller in the circuit of the motor to adjust the speed of said motor until the 90° phase shift and resonance are achieved. An alternating current tachometer generator is driven by the motor and the output of said generator is connected to a linearization network having its linear alternating current voltage output connected to a potentiometer actuated by the speed of the conveyor. The output of the potentiometer is transmitted to an integrator.

In the accompanying drawings:

FIG. 1 is a diagrammatic view of the electrical networks forming part of the present invention;

FIG. 2 is an elevational view of a belt conveyor provided with the present invention;

FIG. 3 is a cross sectional view, on an enlarged scale, taken on the line 3—3 of FIG. 2 looking in the direction of the arrows to show the mounting of the motor and the means for checking the vibration of the load on the conveyor;

FIG. 4 is a cross sectional view, on an enlarged scale, taken on the line 4—4 of FIG. 2 looking in the direction of the arrows to show the mounting of the eccentric and the means to check the speed of the motor;

FIG. 5 is a cross sectional view, an an enlarged scale, taken on the line 5—5 of FIG. 2 looking in the direction of the arrows to show the mounting of the stringers;

FIG. 6 is a fragmentary view of FIG. 3, on an enlarged scale, showing a flexible connection between the motor and the eccentric, and the means to check the vibration of the load on the conveyor;

FIG. 7 is a fragmentary view of FIG. 4, on an enlarged scale, showing the mounting of the eccentric and the means for checking the speed of the motor; and FIG. 8 is a cross sectional view taken on the line 8—8 of FIG. 7 looking in the direction of the arrows to show the means for checking the speed of the motor.

The invention is embodied in an endless belt conveyor 9 having the load supporting stretch supported by idlers 10 mounted on stringers 11 supported by vertical members 12 so that the stringers 11 will act like springs or vibrating members.

Vibration of the stringers 11 is induced by eccentrices 13 secured on shafts 14 rotatably supported in bearings 15 secured to plates 16 fixed to and suspended from the stringers 11. The shafts 14 are coupled to each other by a tubing 17 connected by universal joints 18 to the shafts 14. Instead of two eccentrics as illustrated, one eccentric could be mounted on the center of a shaft supported at the opposite end portions in the bearings 15.

The eccentrics 13 are rotated by a direct current electric motor 19 mounted on a shelf 20 supported at the opposite end portions by the vertical members 12. The motor 19 is operatively connected to one of the shafts 14 by a flexible shaft 21 provided with universal joints 22, one being connected to the drive shaft of the motor 19 and the other joint being connected to a shaft 23 rotatably mounted in a bearing 24 on a plate 25 suspended from one of the stringers 11, as shown in FIGS. 2, 3 and 6. The shaft 23 is provided with a pulley 26 engaged by a belt 27 engaging a pulley 28 on one of the shafts 14.

The resonant vibrating frequency changes for each load condition of the belt conveyor 9 and the resonance is achieved when the vibrating frequency of the load on the belt conveyor 9 will lag the frequency or speed of the motor 19 by exactly ninety degree phase angle. If the phase angle is smaller than ninety degrees, the speed of the motor 19 is too low, and if the phase angle is larger than 90°, the speed of the motor 19 is too high.

The relative phase angle is checked by two suitable means, such as an induction coil 29 on an angle bracket 30 secured to the plate 16. The coil 29 is pulsed by an one tooth pulser wheel or projection 31 of ferrous material secured to the shaft 14 provided with the pulley 28, so that the projection 31 will travel in a circular path adjacent to the induction coil 29. The other suitable means is an induction coil 32 supported by the platform 20 relative to the vertical vibration movements of an arm 33 extended from the plate 25 to receive the vibrations from the load system including the belt conveyor 9 and the stringers 11.

The induction coils 29 and 32 are connected by conductors 34 and 35, respectively, to a phase sensitive network, indicated in a general manner at 36 in FIG. 1, and electrically connected to a SCR speed controller, indicated in a general manner at 37 and electrically connected to the motor 19 to adjust the speed of said motor 19 until the 90° phase shift and resonance are achieved.

An alternating current tachometer generator 38 is mounted on the shelf 20 and operatively coupled to the rear shaft extension of the motor 19. The output of the generator 38 is used by another network, indicated at 39 in FIG. 1, with an impedance in its output to obtain a linear alternating current voltage. For speed compensation, this linear alternating current voltage output of the network 39 is passed across a potentiometer 40 actuated by a speed sensing unit 41 actuated by the speed of travel of the belt conveyor 9 through a transmission line 42 to obtain the product of the the speed of travel of the belt conveyor 9 and the load on the belt conveyor 9. The output of the potentiometer 40 is connected by electric conductors 43 to an integrator, not shown.

Having thus described my invention, I claim:

1. A mass measuring system applied to belt conveyors comprising a pair of stringers supporting a belt conveyor, an eccentric rotatably supported by the stringers, motive means supported independently of the stringers and operatively connected to the eccentric to rotate said eccentric and the rotation of the eccentric vibrating the stringers at a resonant frequency corresponding to the load on the conveyor, and a phase sensitive network including means receiving pulses from the vibrations of the stringers and from the rotation of the eccentric and electrically connected to the motive means whereby the network detects deviation of a ninety degree phase angle lag of the frequencies of the stringers and the eccentric and adjusts the motive means to maintain said ninety degree angle lag.

2. A mass measuring system applied to belt conveyors as claimed in claim 1, wherein a portion of each stringer is supported by two spaced vertical members.

3. A mass measuring system applied to belt conveyors as claimed in claim 2, wherein the motive means is supported by said vertical members.

4. A mass measuring system applied to belt conveyors as claimed in claim 1, wherein the means receiving pulses from the vibrations of the stringers comprises an arm of ferrous material carried by a stringer and an induction coil positioned adjacent to the path of the vibrating travel of said arm.

5. A mass measuring system applied to belt conveyors as claimed in claim 1, wherein the means receiving pulses from the rotation of the eccentric comprises a projection of ferrous material operatively connected to the motive means to rotate at the speed of said motive means and the eccentric, and an induction coil positioned adjacent to the path of travel of said projection.

6. A mass measuring system applied to belt conveyors as claimed in claim 2, wherein the means receiving pulses from the vibrations of the stringers comprises an arm of ferrous material carried by a stringer and an induction coil supported by the vertical members adjacent to the path of the vibrating travel of said arm.

7. A mass measuring system applied to belt conveyors as claimed in claim 1, wherein the means receiving pulses from the rotation of the eccentric comprises a projection of ferrous material rotatable with the eccentric and an induction coil supported by one of the stringer adjacent to the path of travel of the projection.

8. A mass measuring system applied to belt conveyors as claimed in claim 1, wherein the motive means is operatively connected to the eccentric by a flexible shaft rotatably supported by a stringer and driven by the motive means, and a belt connecting the flexible shaft to the eccentric.

9. A mass measuring system applied to belt conveyors as claimed in claim 1, a SCR speed controller electrically connecting the phase sensitive network to the motive means to adjust the speed of the motive means.

10. A mass measuring system applied to belt conveyors as claimed in claim 1, wherein the motive means is a direct current electric motor, an alternating current tachometer generator driven by said motor, a linearization network electrically connected to the output of said generator, a potentiometer electrically connected to the output of the linearization network, and a speed sensing unit actuated by the travel of the belt conveyor and operative connected to the potentiometer to adjust the potentiometer and obtain the product of said travel and the load on the conveyor.

* * * * *